(12) United States Patent
Fukuda

(10) Patent No.: US 7,599,767 B2
(45) Date of Patent: Oct. 6, 2009

(54) CONTROL APPARATUS AND CONTROL METHOD FOR AIRCRAFT

(75) Inventor: Daiki Fukuda, Fuji (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 257 days.

(21) Appl. No.: 11/484,669

(22) Filed: Jul. 12, 2006

(65) Prior Publication Data

US 2007/0129856 A1 Jun. 7, 2007

(30) Foreign Application Priority Data

Jul. 14, 2005 (JP) ............... 2005-206002

(51) Int. Cl.
G05D 1/08 (2006.01)

(52) U.S. Cl. ............... 701/4; 701/100; 60/726; 60/772; 60/262

(58) Field of Classification Search ............ 701/4, 701/100; 477/14, 20, 30; 60/726, 772, 262; G05D 1/08
See application file for complete search history.

(56) References Cited

U.S. PATENT DOCUMENTS

| | | | |
|---|---|---|---|
| 5,363,317 A | 11/1994 | Rice et al. | |
| 5,566,542 A * | 10/1996 | Chen et al. | 60/775 |
| 5,873,546 A * | 2/1999 | Evans et al. | 244/17.13 |
| 6,516,603 B1 * | 2/2003 | Urbach et al. | 60/39.3 |
| 6,880,784 B1 * | 4/2005 | Wilkinson et al. | 244/76 R |
| 7,266,940 B2 * | 9/2007 | Balan et al. | 60/39.181 |
| 2004/0088991 A1 * | 5/2004 | Gallant et al. | 60/772 |
| 2004/0103637 A1 * | 6/2004 | Maisotsenko et al. | 60/39.59 |
| 2007/0125905 A1 | 6/2007 | Fukuda | |
| 2008/0245050 A1 * | 10/2008 | Wollenweber | 60/39.15 |

FOREIGN PATENT DOCUMENTS

| | | | |
|---|---|---|---|
| JP | 60047824 A * | 3/1985 | |
| JP | 62-89499 | 4/1987 | |
| JP | 6-178599 | 6/1994 | |
| JP | 8-502805 | 3/1996 | |
| JP | 9-249200 | 9/1997 | |
| JP | 2004-26034 | 1/2004 | |
| JP | 2004-98752 | 4/2004 | |
| JP | 2004-353489 | 12/2004 | |
| JP | 2005061353 A * | 3/2005 | |
| JP | 2005-90300 | 4/2005 | |
| JP | 2005-105951 | 4/2005 | |
| JP | 2005-106016 | 4/2005 | |
| JP | 2005-125976 | 5/2005 | |

* cited by examiner

Primary Examiner—Tuan C To
(74) Attorney, Agent, or Firm—Finnegan, Henderson, Farabow, Garrett & Dunner, LLP

(57) ABSTRACT

When both engines operate properly, a control apparatus for an aircraft performs control of thrust and attitude of an aircraft using an output that is produced evenly by the two engines. When a failure occurs in one of the two engines, the control apparatus performs the control of thrust and attitude of the aircraft by increasing an output of the remaining engine that operates properly to an emergency output. When the failure occurs in one of the two engines, the control apparatus makes an engine output that is used for the control of thrust and attitude of the aircraft lower than an engine output that is used when both engines operate properly, until the remaining engine that operates properly is enabled to produce the emergency output.

6 Claims, 11 Drawing Sheets

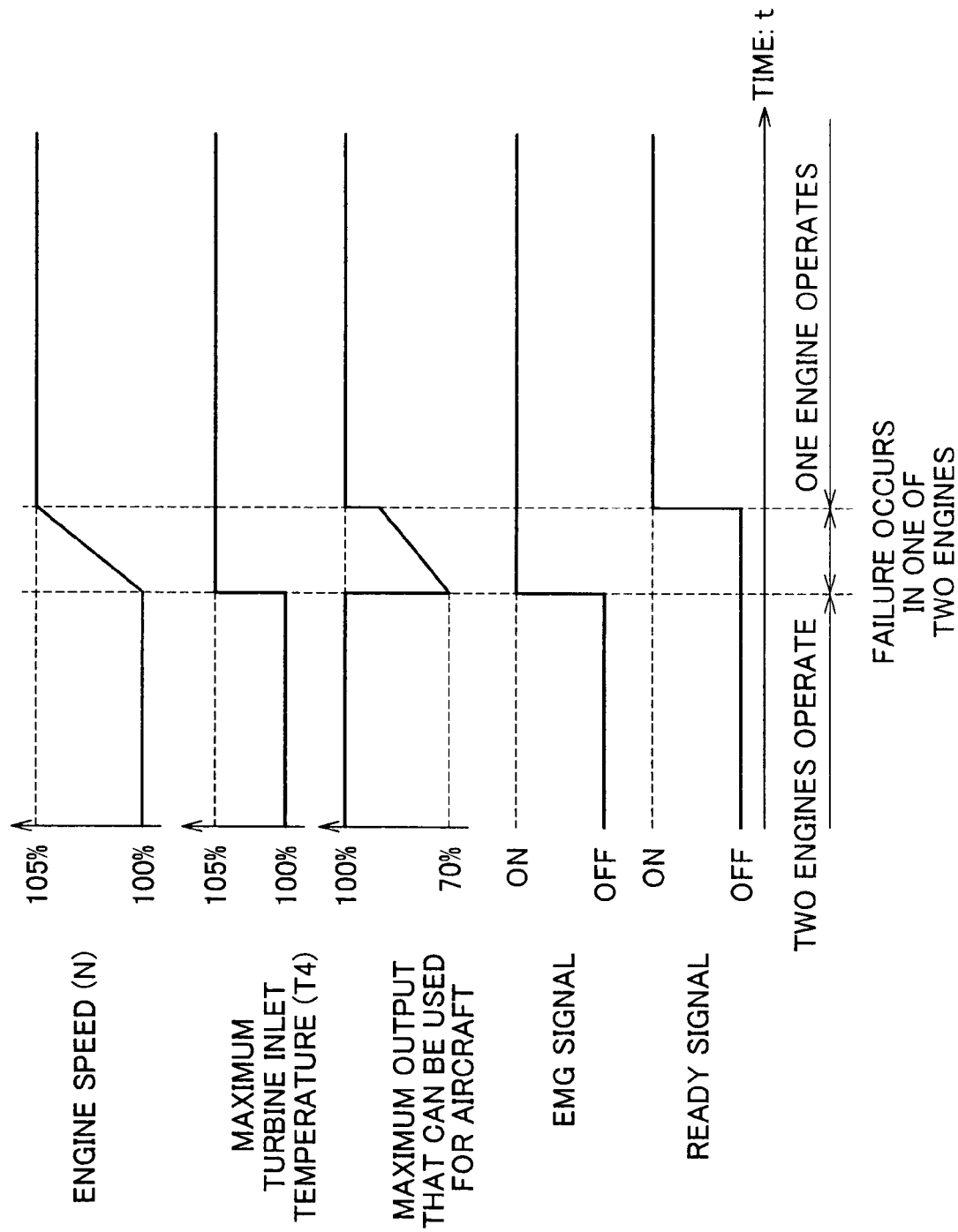

CONTROL APPARATUS AND CONTROL METHOD FOR AIRCRAFT

INCORPORATION BY REFERENCE

The disclosure of Japanese Patent Application No. 2005-206002 filed on Jul. 14, 2005 including the specification, drawings and abstract is incorporated herein by reference in its entirety.

BACKGROUND OF THE INVENTION

1. Field of the Invention

The invention relates to a control apparatus and method for controlling thrust and attitude of an aircraft provided with two gas-turbine engines.

2. Description of the Related Art

Published Japanese Translation of PCT application JP-T-08-502805 describes a technology related to a helicopter provided with two free turbine engines. According to the technology, when a failure is detected in one of the two engines, the upper limit of operable range for the remaining engine is increased.

Aircraft, such as a helicopter, that obtains thrust using two engines are configured to ensure safe operation even in the event of an engine failure. Even if a failure occurs in one of the two engines, the aircraft can continue flying using the remaining engine. Accordingly, the engine output is set, basically, to a value at which the aircraft can continue flying safely using only one engine.

When both engines are operating properly, the output required by the aircraft is produced by the two engines. Accordingly, in this case, the output from each one of the two engines is lower than the output when only one engine is used.

The fuel economy of gas turbine engines operating at a low load is very poor. Accordingly, it is an important object to improve the fuel economy when both engines of the aircraft operate at low load.

In order to improve the fuel economy of the engines, an OEI (One Engine Inoperative) output (i.e., an increased engine output that is used only in the event of an emergency) from the engine may be used when an emergency arises, for example, when a failure occurs in one of the two engines. In this method, when a failure occurs in one of the two engines, the engine speed and the turbine inlet temperature are increased above the levels when the engine produces the rated output, in the remaining engine that operates properly. A greater engine output is then produced, which enables the aircraft to continue flying using only one engine.

As described above, in an engine configured on the assumption that the OEI output (emergency output) may be used, if an emergency arises, the engine output is increased by increasing the engine speed and the turbine inlet temperature above the levels when the engine runs to produce the rated output. Accordingly, unless the engine, speed and the turbine inlet temperature increase to predetermined values, the required output cannot be produced. Therefore, in the event of an emergency, it is necessary to enable the engine to produce the OEI output as soon as possible.

However, in a system configured on the assumption that the OEI output is used in the event of an emergency, immediately after a failure occurs in one of the two engines, the engine speed of the remaining engine that operates properly has not increased to the predetermined value yet. Accordingly, if the output required by the aircraft is greater than the output produced by the engine, the engine is overloaded, which prevents the engine speed from increasing to the value at which the OEI output can be produced. Alternatively, there may be a considerable delay before the OEI output is produced.

SUMMARY OF THE INVENTION

The invention is made in light of the above-described circumstances. It is, therefore, an object of the invention to provide a technology for promptly producing an emergency output (i.e., OEI output) in a control apparatus and control method applied to an aircraft in which thrust and attitude are controlled using the emergency output in the event of an emergency.

With a control apparatus or a control method for an aircraft according to a first aspect of the invention, when both engines operate properly, control of thrust and attitude of an aircraft is performed using an output evenly produced by the two engines. When a failure occurs in one of the two engines, the control of thrust and attitude of the aircraft is performed by increasing the output of the remaining engine to an emergency output level. In addition, when the failure occurs in one of the two engines, the amount of increase in the engine output of the remaining engine may be limited, until the remaining engine that operates properly is enabled to produce the emergency output. Alternatively, an one-engine-output that is produced by the remaining engine may be made less than a maximum allowable output that can be produced by each of the two engines.

The aircraft is provided with the two engines, as a safeguard against failure in the engine. When both engines operate properly, the control of thrust and attitude of the aircraft is performed using the output evenly produced by the two engines. When the failure occurs in one of the two engines, the control of thrust and attitude of the aircraft is performed by increasing the output of the remaining engine to the emergency output.

In this case, the engine speed and the turbine inlet temperature may be increased over levels when the two engines are operating properly and the output is produced evenly by the two engines.

As described above, the output is increased to the emergency output by increasing the engine speed and the turbine inlet temperature over those when the output is evenly produced by the two engines. In such a case, the required output cannot be produced unless the engine speed and the turbine inlet temperature are increased to predetermined values. However, immediately after the failure occurs in one of the two engines, the engine speed of the remaining engine is not immediately increased to the predetermined value. Accordingly, if the output required by the aircraft is greater than the output of the engine, the engine is overloaded, and the engine speed is not increased to an engine speed at which the emergency output can be produced. Alternatively, there may be a considerable delay before the emergency output is produced.

In the control apparatus or a control method for an aircraft according to the first aspect, when the failure occurs in one of the two engines, the output of the remaining engine is increased, but the amount of increase in the output is limited such that the output of the remaining engine is less than an output that is produced by the two engines when both of the two engines operate properly, until the remaining engine that operates properly is enabled to produce the emergency output. Alternatively, the one-engine-output that is produced by the remaining engine may be made less than a maximum allowable output that can be produced by each of the two engines. Thus, the engine load can be reduced during the time when the engine output of the remaining engine is shifted to emergency output levels. Accordingly, the engine speed can be increased quickly. As a result, the emergency output can be produced quickly.

If the engine output that can be used to control thrust and attitude of the aircraft is reduced, the maximum output that can be used for the aircraft is limited, which affects the control of thrust and attitude. However, the time between the failure in one of the two engines and the production of emergency output in the remaining engine is short, which does not have a considerable influence on the aircraft. Inversely, the advantage of producing the emergency output in a short time is more prominent.

In the control apparatus or a control method for an aircraft according to the first aspect, when one of the two engines fails, the engine output that is used to control thrust and attitude of the aircraft may be reduced by a predetermined amount until the remaining engine that operates properly is enabled to produce the emergency output. Thus, the engine load can be reliably reduced during the time when the engine output of the remaining engine is shifted to emergency output levels. Accordingly, the engine speed can be increased quickly, and the emergency output can be produced quickly.

When one of the two engines fails, the engine output that is used to control thrust and attitude of the aircraft may be reduced based on the engine speed of the remaining engine, until the remaining engine is able to produce the emergency output.

The engine output that is used to control thrust and attitude of the aircraft can be increased as the engine speed increases. The restriction on the amount of the engine output that is used to control thrust and attitude of the aircraft is reduced as the engine speed increases during the time when the engine output of the remaining engine is shifted to emergency output levels. Thus, the flight performance can be improved as compared to when the restriction on the engine output for controlling thrust and attitude is constant. In addition, the engine speed can be increased more quickly than when the engine output is limited. As a result, the emergency output can be produced more quickly.

BRIEF DESCRIPTION OF THE DRAWINGS

The foregoing and further objects, features and advantages of the invention will become apparent from the following description of example embodiments with reference to the accompanying drawings, wherein the same or corresponding portions are denoted by the same reference numerals and wherein:

FIG. 11 illustrates the time-sequence chart schematically showing the operation of the aircraft according to the second embodiment.

DETAILED DESCRIPTION OF THE EXAMPLE EMBODIMENTS

Hereafter, example embodiments of the invention will be described in detail with reference to accompanying drawings. The scope of the invention is not limited by sizes, materials, shapes, relative configuration, etc. of components described in the embodiments, unless otherwise specified.

Figure 1:
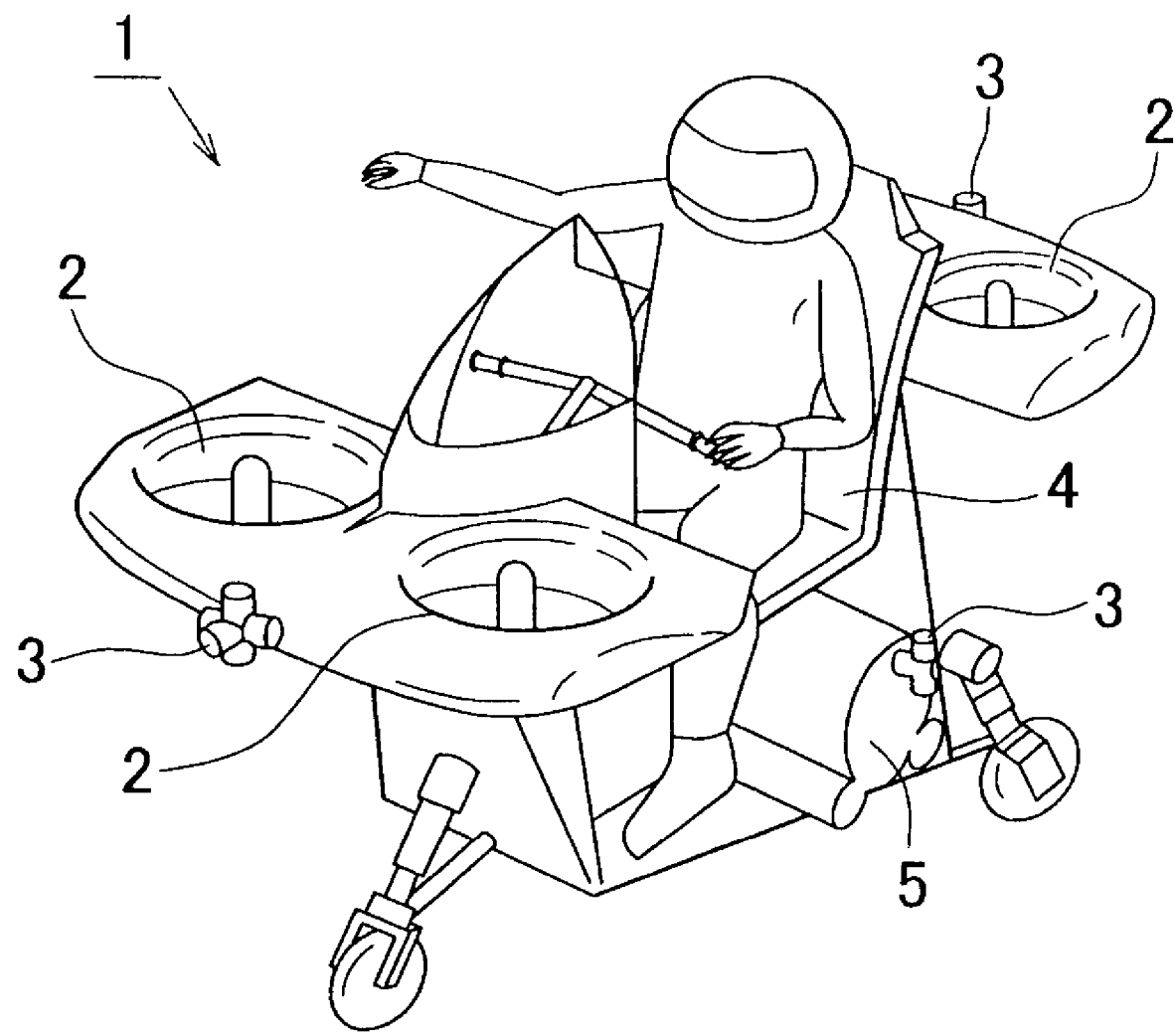
FIG. 1 illustrates the schematic view of the configuration of an aircraft according to embodiments of the invention.

Hereafter, a first embodiment of the invention will be described. FIG. 1 illustrates the appearance of an aircraft 1 according to the example embodiments of the invention. As shown in FIG. 1, the aircraft 1 includes two thrust generators (thrust generating means) 2, which are provided at the front and rear of the aircraft 1, respectively; four reaction jet nozzles (hereinafter, simply referred to as "nozzles") 3, which are provided at the front and rear, and on the right and left of the aircraft 1, respectively. The aircraft 1 also includes a drive source 5 provided below an occupant seat 4.

Figure 2:
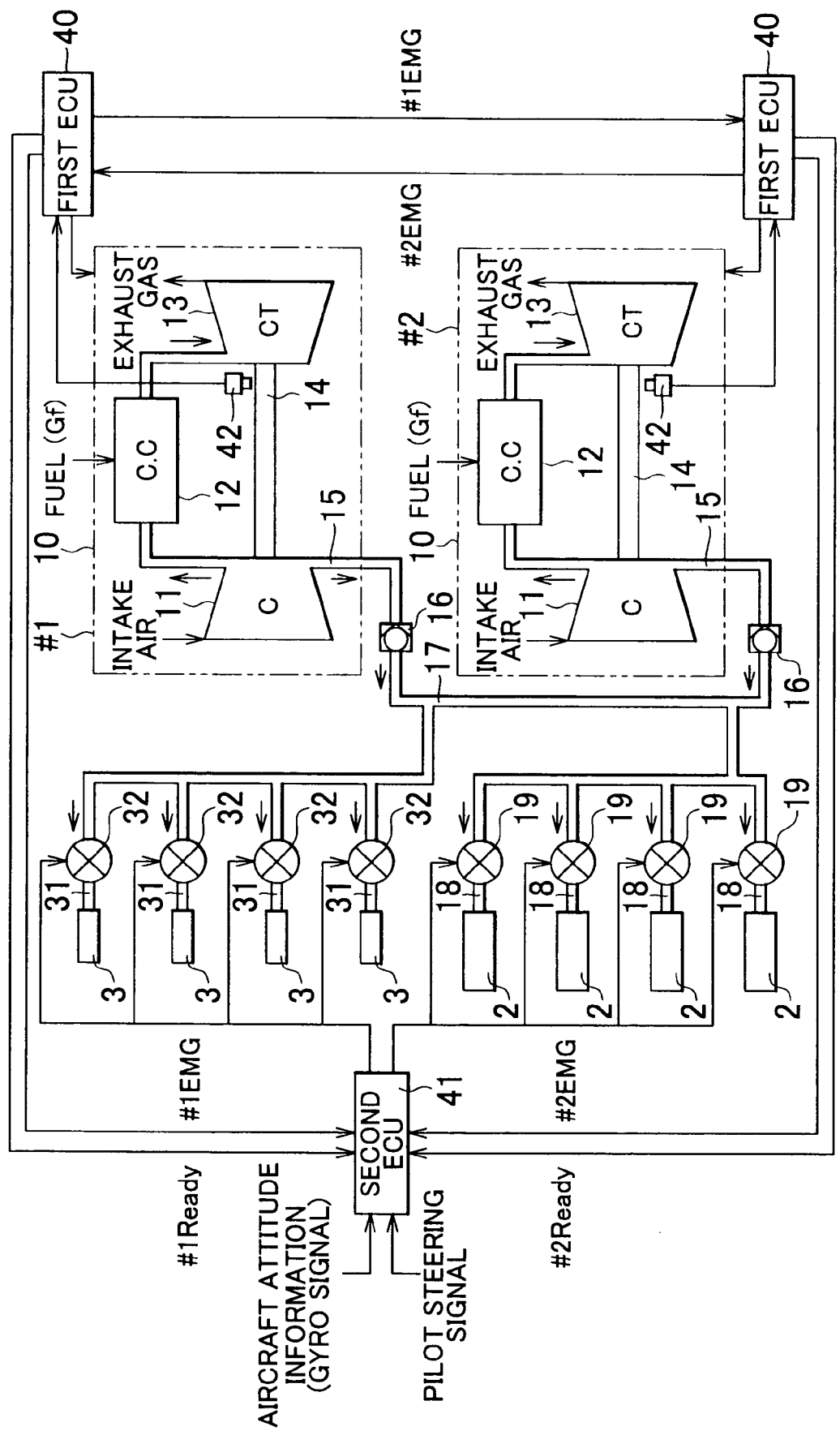
FIG. 2 illustrates the schematic diagram of gas-turbine engines, etc. according to a first embodiment of the invention.

FIG. 2 schematically illustrates the configuration of the drive source 5. The drive source 5 is provided with two gas-turbine engines (hereinafter, sometimes referred to as "engines") 10 that are a first gas-turbine engine (#1) and a second gas-turbine engine (#2).

Each engine 10 includes a compressor 11, a combustion chamber 12, and a turbine 13. The air taken into the compressor 11 (intake air) is compressed by the compressor 11, mixed with the fuel supplied from a fuel injector (not shown), and burned in the combustion chamber 12. The combustion gas is used to drive the turbine 13 connected directly to the compressor 11 via a rotating shaft 14, and then discharged to the outside of the engine 10.

An extraction passage 15 is connected to the compressor 11. Part of the air compressed by the compressor 11 is discharged to the extraction passage 15. The extraction passages 15 of the engines 10 are connected to an air collecting passage 17. The compressed air discharged from one of the compressors 11 and the compressed air discharged from the other compressor 11 are gathered in the air collecting passage 17. A check valve 16 is provided in each extraction passage 15. The check valve 16 permits the compressed air to flow toward the air collecting passage 17, and prohibits the compressed air from flowing from the air collecting passage 17 toward the compressor 11. Thus, the compressed air from one engine 10 does not flow into the remaining engine 10.

The air collecting passage 17 is connected to four thrust air passages 18. Each of the four thrust air passages 18 is provided with an airflow rate control valve 19. The airflow rate control valve 19 is driven in response to a command from an ECU, described later in detail. The airflow rate control valve 19 can change the flow passage area of the thrust air passage 18. The four thrust air passages 18 are connected to the respective a thrust generators 2.

Figure 3:
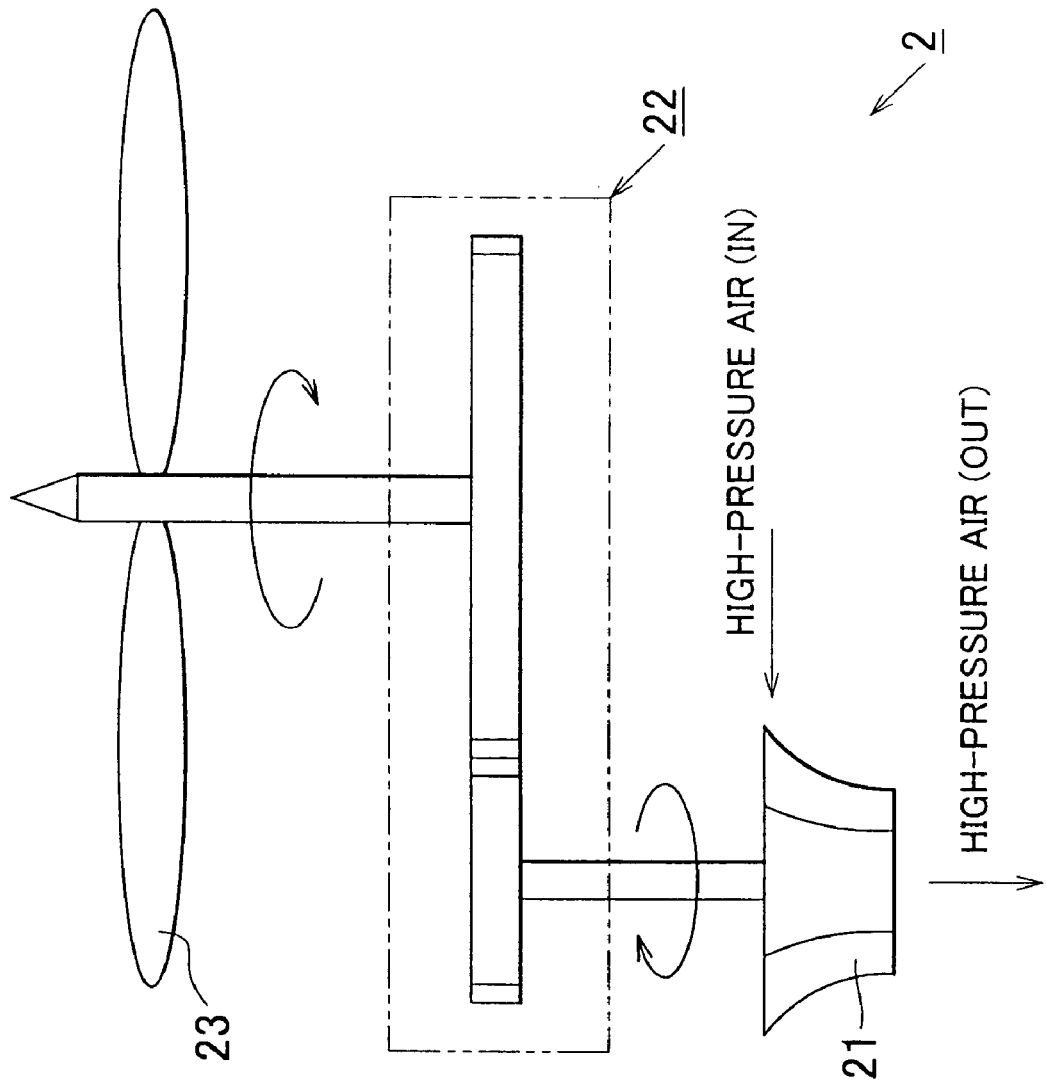
FIG. 3 illustrates the schematic view of the configuration of a thrust generator.

FIG. 3 illustrates the schematic view of the configuration of the thrust generator 2. The thrust generator 2 mainly includes a turbine 21, a reducer 22, and a fan 23. The turbine 21 is driven using the energy generated due to expansion of the compressed air flowing from the thrust air passage 18. Then, the speed of the turbine 21 is reduced by the reducer 22, and the fan 23 turns at a reduced speed. The fan 23 turns at a high speed and generates an airflow flowing downward of the aircraft, whereby thrust, which is applied in the upward direction substantially vertical to the aircraft, is generated. The aircraft 1 can take off or land in the vertical direction using thrust generated by the thrust generator 2.

The air collecting passage 17 is also connected to four attitude adjustment air passages 31. Each of the four attitude adjustment air passages 31 is provided with an electromagnetically driven valve 32. The electromagnetically driven valve 32 is driven in response to commands from the ECU. The electromagnetically driven valve 32 can change the flow passage area of the attitude adjustment air passage 31. The four attitude adjustment air passages 31 are connected to the respective nozzles 3 serving as an attitude control portions. The nozzle 3 emits compressed air into the atmosphere. Attitude of the aircraft can be desirably changed using a reaction force of the air, which is obtained by emitting the compressed air from the nozzles 3 into the atmosphere.

The compressed air required to control thrust or attitude of the aircraft is used for the control of thrust or attitude after flowing through the check valves 16 in order to prevent the compressed air from one engine 10 from flowing into the remaining engine 10. The compressed air from the one of the two engines 10 and the compressed air from the remaining engine 10 are gathered in the air collecting passage 17, and then introduced to the airflow rate control valves 19 or the electromagnetically driven valves 32.

The two engines 10 are used to ensure safe operation. In the event of a failure in one of the two engines 10, the remaining engine 10 can output the power required by the aircraft.

The aircraft 1 thus configured includes a first electronic control unit (ECU) 40 that is provided to each engine 10 and that controls the engine 10; and a second electronic control unit (ECU) 41 that controls thrust and attitude of the aircraft by controlling the airflow rate control valves 19 and the electromagnetically driven valves 32. Each of the ECU 40 and the ECU 41 is an arithmetic-logic circuit including a CPU, ROM, RAM, back-up RAM, etc.

The first ECU 40 is connected, via electric wiring, to various sensors such as a rotation angle sensor 42 that detects a rotation speed of the rotating shaft 14 of the engine 10. The signals output from the various sensors are input in the first ECU 40. The rotation angle sensor 42 is provided, for example, near the rotating shaft 14 and produces pulse signals at intervals of a predetermined rotation angle (for example, 60 degrees). The first ECU 40 calculates the rotation speed of the rotating shaft 14, namely, the number of rotations of the rotating shaft 14 per one minute (hereinafter, sometimes referred to as the "rotation speed") based on the pulse signals received at predetermined time intervals.

The first ECU 40 calculates the amount of fuel to be injected into the combustion chamber 12, based on the predetermined schedule, using the signals from the rotation angle sensors 42, etc. The command value indicating the calculated fuel amount is output to a fuel supply actuator (not shown), and a fuel injection device is controlled based on the command value.

In the aircraft 1 according to the embodiment, when both engines 10 operate properly, the output required by the aircraft is produced evenly by the two engines 10. Even if the engine output changes, the first ECU 40 operates the fuel injection device such that the engine speed is basically maintained constantly at a rated engine speed (N=100%) in order to supply an appropriate amount of fuel to the engines 10. When the engine speed is lower than the rated engine speed, the first ECU 40 operates the fuel injection device to increase the fuel injection amount. On the other hand, when the engine speed is higher than the rated engine speed, the first ECU 40 operates the fuel injection device to decrease the fuel injection amount. Thus, the engine speed is maintained at the rated engine speed.

Figure 4:
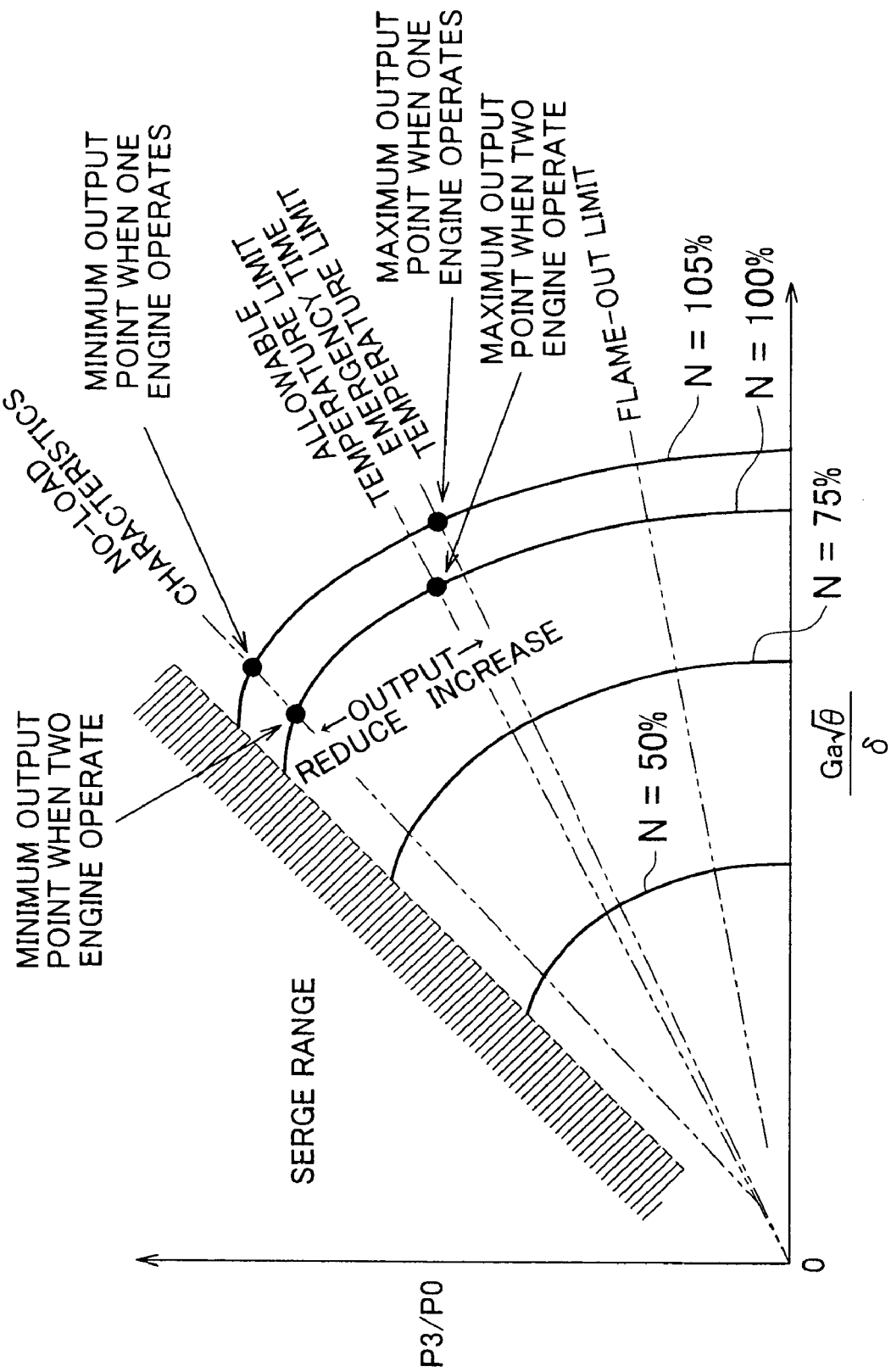
FIG. 4 illustrates the compressor map showing the operations of the gas-turbine engines according to the embodiments.

FIG. 4 shows the typical features of the compressor. As shown in FIG. 4, the features of the compressor are indicated by the solid lines for respective engine speeds N. When a rotation speed N of the compressor is constant, if an amount of air Ga discharged from the compressor increases, a pressure P3 at the outlet of the compressor decreases. On the other hand, if the amount of air Ga discharged from the compressor decreases, the pressure p3 at the outlet of the compressor increases.

In the aircraft 1 according to the embodiments, when both engines 10 operate properly, the engine output is controlled to the output indicated by the curved line corresponding to the rated engine speed (N=100%) shown in FIG. 4, based on the output required by the aircraft.

In FIG. 4, a reference character "θ" indicates a value obtained by dividing the atmospheric temperature by the standard atmospheric temperature (atmospheric temperature/standard atmospheric temperature), and a reference character "δ" indicates a value obtained by dividing the atmospheric pressure by the standard atmospheric pressure (atmospheric pressure (P0)/standard atmospheric pressure). FIG. 4 also shows the serge range where surging occurs at each amount of air Ga discharged from the compressor, and the allowable temperature limit of a turbine inlet temperature (T4). For example, "N=75%" shows that the engine speed is 75% of the rated engine speed (N=100%).

Each first ECU 40 includes an engine failure detector (not shown) that determines whether a failure occurs in the engine 10 that renders the engine 10 incapable of producing the required output based on the signals output from the various sensors. If the engine failure detector determines that a failure occurs in one of the two engines 10 and the affected engine 10 is incapable of producing the required output, the first ECU 40 transmits an emergency (hereinafter, referred to as "EMG") signal, which is a failure signal, to the first ECU 40 of the remaining engine 10. On the other hand, when the engine failure detector determines that a failure is not present in the engine 10, an EMG signal is not output to the first ECU 40 of the remaining engine 10.

Each first ECU 40 also includes an EMG signal receiver (not shown) that receives the EMG signal thus output from the first ECU 40 of the remaining engine 10. When the EMG signal receiver receives the EMG signal, the first ECU 40 turns an EMG flag ON. When the EMG signal is OFF, the remaining engine 10 operates properly. On the other hand, when the EMG flag is ON, the remaining engine 10 does not operate properly.

It is determined that a failure occurs in the engine 10, when the engine speed N does not exceed the predetermined speed even though a predetermined amount of fuel is supplied to the combustion chamber 12, or when the outlet pressure of the compressor 11 is lower than the predetermined pressure even though the rotation speed of the rotating shaft 14 has reached the predetermined rotation speed.

As described above, the aircraft 1 according to the embodiment is provided with the two engines 10. When both engines 10 operate properly, the required output is produced evenly by the two engines 10, which may be regarded as a two-engine-output.

On the other hand, when a failure occurs in one of the two engines 10 and the required engine output cannot be produced evenly by the two engines 10, the entire output required by the aircraft needs to be produced by only the remaining engine 10 that operates properly. In the aircraft 1 according to the embodiment, in the event of such an emergency, an emergency output operation, which is not used in the regular operation, is enabled. Namely, when a failure occurs in one of the two engines 10, the engine speed of the remaining engine 10 that operates properly may be increased by approximately 5%, and the inlet temperature (T4) of the turbine 13 may be increased by approximately 5% with respect to the allowable temperature limit (T4=100%). Namely, the engine speed is maintained at "N=105%", and the inlet temperature (T4) of the turbine 13 is increased up to 105% with respect of the allowable temperature limit. Thus, the OEI (One Engine Inoperative) output can be used. The OEI output corresponds to the output obtained by increasing the output from one engine, in the event of an emergency, by approximately 30% with respect to the maximum rated output that can be continuously used without restriction of use.

A relatively large aircraft such as a helicopter can land at only appropriate places, when a failure occurs in one of the two engines. Accordingly, even if a failure occurs in one of the two engines, the aircraft needs to continue flying for a while. Therefore, the engine is usually designed to be capable of producing an extra output. In contrast, a compact aircraft (the riding capacity is four or less) such as the aircraft 1 according to the embodiment can land at even a relatively small space. Therefore, even in the event of an emergency, for example, in the event of a failure in one of the two engines, the aircraft 1 can land quickly. Therefore, the engine need not be designed to be capable of producing an extra output as great as that of a larger aircraft.

In light of the above-mentioned circumstances, application of the engine 10 according to the embodiment is limited only to compact aircraft as shown in FIG. 1. When the maximum rated output that can be continuously used without restriction of use is 100%, in the event of an emergency such as a failure in one of the two engines, the output from the remaining engine can be increased to 130% within a limited time (approximately 2.5 minutes).

In relatively large aircraft such as a helicopter that can continue flying for a while using only one engine, the engine output (maximum rated output) of 100% is the maximum output required of the engine when the aircraft flies using only one engine. When the output required by the aircraft is produced evenly by the two engines, the maximum output of one engine is 50% of the maximum rated output.

Meanwhile, the aircraft 1 according to the embodiment, in the event of an emergency such as a failure in one of the two engines, the OEI output of the remaining engine is used, and the output required by the aircraft to fly is up to 130%. Accordingly, when the output required by the aircraft is produced evenly by the two engines that operate properly, the output from one engine is up to 65% of the maximum rated output.

In the thus configured aircraft 1, each first ECU 40 controls the amount of fuel supplied to the combustion chamber 12 in the following manner.

When the EMG flag is OFF, an appropriate amount of fuel is supplied to the engine by the fuel injection device such that the engine speed is constantly maintained at the rated engine speed (N=100%). Namely, in such a case, while the target engine speed is maintained at the rated engine speed, the engine output may be adjusted based on the output required by the aircraft using the maximum rated output as the upper limit (using the upper limit of the allowable temperature limit (T4=100%) as the upper limit of the turbine inlet temperature T4).

On the other hand, when the EMG flag is ON, the amount of fuel supplied to the engine is controlled based on the output required by the aircraft such that the engine speed is constantly maintained at 105% using 130% of the maximum rated output as the upper limit (using 105% of the allowable temperature limit as the upper limit of the turbine inlet temperature T4).

Figure 5:
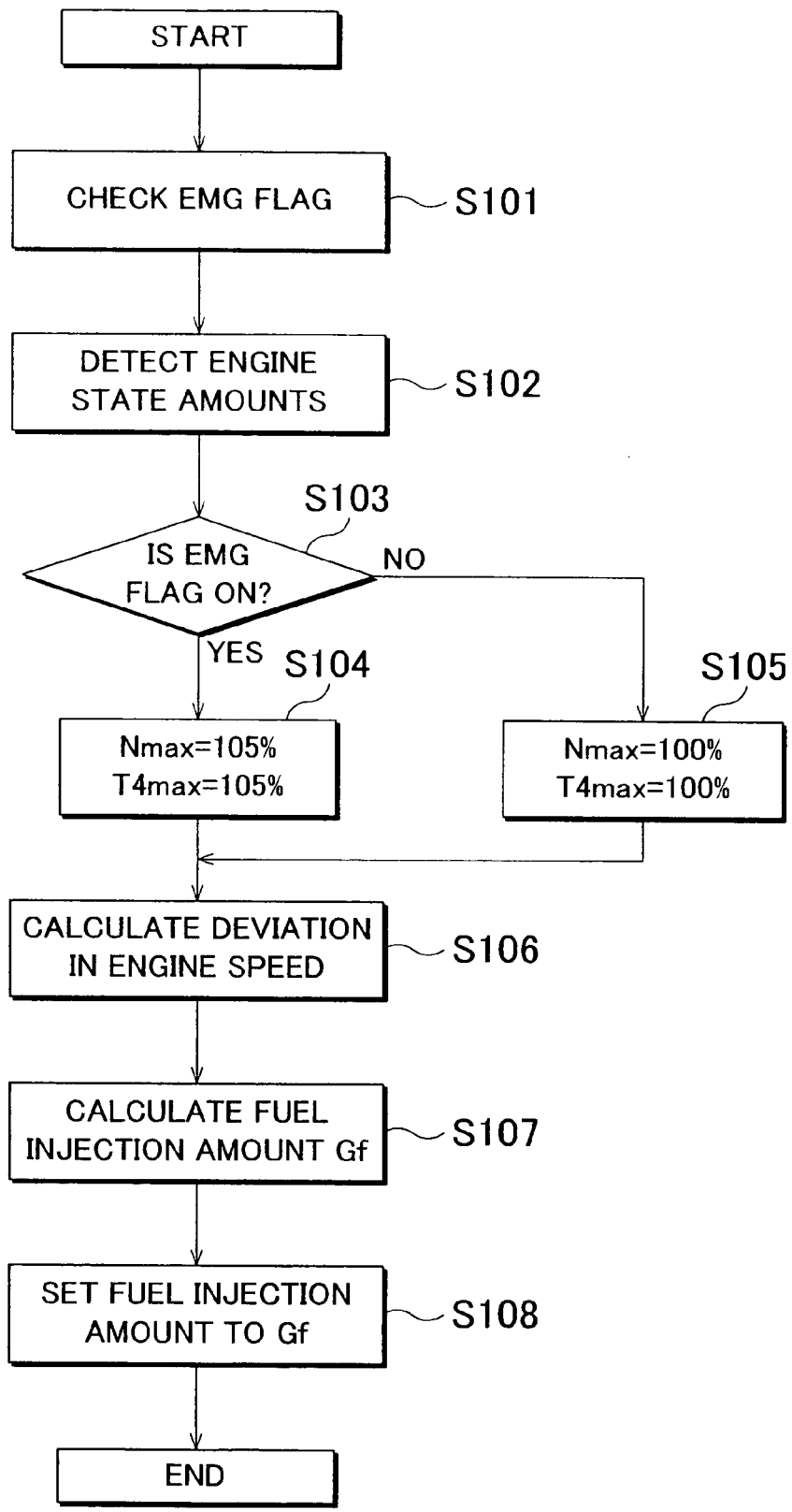
FIG. 5 illustrates the flowchart of the fuel injection amount control routine according to the embodiments.

More specifically, the control is performed according to the fuel injection amount control routine shown in the flowchart in FIG. 5. This control routine is performed by each first ECU 40 at predetermined time intervals as an interrupt routine.

First, in step S101, the EMG flag is checked. Then, in step S102, engine state amounts for obtaining the engine operating state, such as an engine speed N, an atmospheric temperature T0, an atmospheric pressure P0, a compressor outlet temperature T3, a compressor outlet pressure P3, and a turbine inlet temperature T4 are detected based on the signals output from various sensors.

Then, it is determined in step S103 whether the EMG flag is ON. If an affirmative determination is made, the maximum engine speed (Nmax) is set to 105% and the maximum turbine inlet temperature (T4max) is set to 105% in step S104. On the other hand, if a negative determination is made is step S105, the maximum engine speed (Nmax) is set to 100%, and the maximum turbine inlet temperature (T4max) is set to 100%.

Then, the deviation of the actual engine speed from the target engine speed is calculated in step S106. In step S107, a fuel injection amount Gf is calculated based on the deviation in the engine speed calculated in step S106. When the actual engine speed N is equal to the target engine speed, the fuel injection amount value obtained in the immediately preceding routine is used as the fuel injection amount Gf for the current routine. On the other hand, when the actual engine speed is lower than the target engine speed, correction is made such that the fuel injection amount is larger than that in the immediately preceding routine. On the other hand, when the actual engine speed is higher than the target engine speed, correction is made such that the fuel injection amount is lower than that in the immediately preceding routine. The correction amount is calculated by applying the deviation in the engine speed in a predetermined map.

In step S108, the amount of fuel to be injected in the subsequent is set to the fuel injection amount Gf calculated in step S107.

Hereafter, the control of thrust and attitude of the aircraft will be described.

In the embodiment, the twin-engine configuration is employed. When both of the engines operate properly, because the maximum output from both of the engines is 130%, thrust required for the aircraft can be output. In contrast, when a failure occurs in one of the two engines, the output required by the aircraft cannot be produced because the engine output decreases to 65% immediately after a failure occurs, if no measure is taken.

When a failure occurs in one of the two engines, the operation state needs to be immediately shifted to the operation state where the OEI output operation can be performed (the engine speed needs to be increased by 5%, and the turbine inlet temperature needs to be increased by 5%). However, in the state where the engine output is smaller than the output required by the aircraft, the engine is overloaded and the engine speed cannot be increased to the required engine speed, or there may be a considerable delay before the required engine speed can be produced.

The following equation (1) shows that the turbine output needs to exceed the sum of the horsepower consumed by the compressor, the output from the engine, and mechanical loss in order to increase the engine speed and accelerate the increase.

$$\text{Acceleration energy} = \text{turbine output} - \text{horse power consumed by compressor} - \text{engine output} - \text{mechanical loss} \quad (1)$$

The horse power consumed by the compressor and the mechanical loss in the equation (1) are primarily determined based on the operating state of the engine.

In light of the above-mentioned circumstances, in the embodiment, when a failure occurs in one of the two engines, the engine output in the equation (1), namely, the engine output used to control thrust and attitude of the aircraft is temporarily decreased in order to promote shifting to the emergency output (OEI output) operation of the remaining engine that operates properly.

The first ECU 40 of the first engine outputs a #1EMG signal and a #1Ready signal to the second ECU 41, and the first ECU 40 of the second engine outputs a #2EMG signal and a #2Ready signal to the second ECU 41.

Each of the #1EMG signal and the "2EMG signal is the same as the EMG signal described above. When a failure occurs in one of the two engines and the remaining engine operating properly is enabled to perform the OEI output operation, the #1Ready signal and the #2Ready signal are output from the first ECU 40 of the properly operating engine. For example, if a failure occurs in the first engine, the #2Ready signal is output from the first ECU 40 of the second engine, once the engine output of the remaining engine is increased to the level required for the OEI output operation (the engine speed is increased by 5% and the turbine inlet temperature is increased by 5%).

The second ECU 41 includes the EMG signal receiver (not shown) that receives the EMG signal output in the above-mentioned manner. When the EMG signal receiver receives the EMG signal, the second ECU 40 turns the EMG flag of the corresponding engine 10 ON. Namely, when the EMG flags are both OFF, both engines 10 are operating properly. When one of the EMG flags is ON, the engine 10 corresponding this EMG flag is not operating properly.

The second ECU 41 includes a Ready signal receiver (not shown) that receives a Ready signal from the first ECU 40. When the Ready signal receiver receives the Ready signal, the second ECU 41 turns the Ready flag ON. Namely, when one of the Ready flags is ON, the engine 10 corresponding to this Ready flag can perform the OEI output operation.

Figure 6:
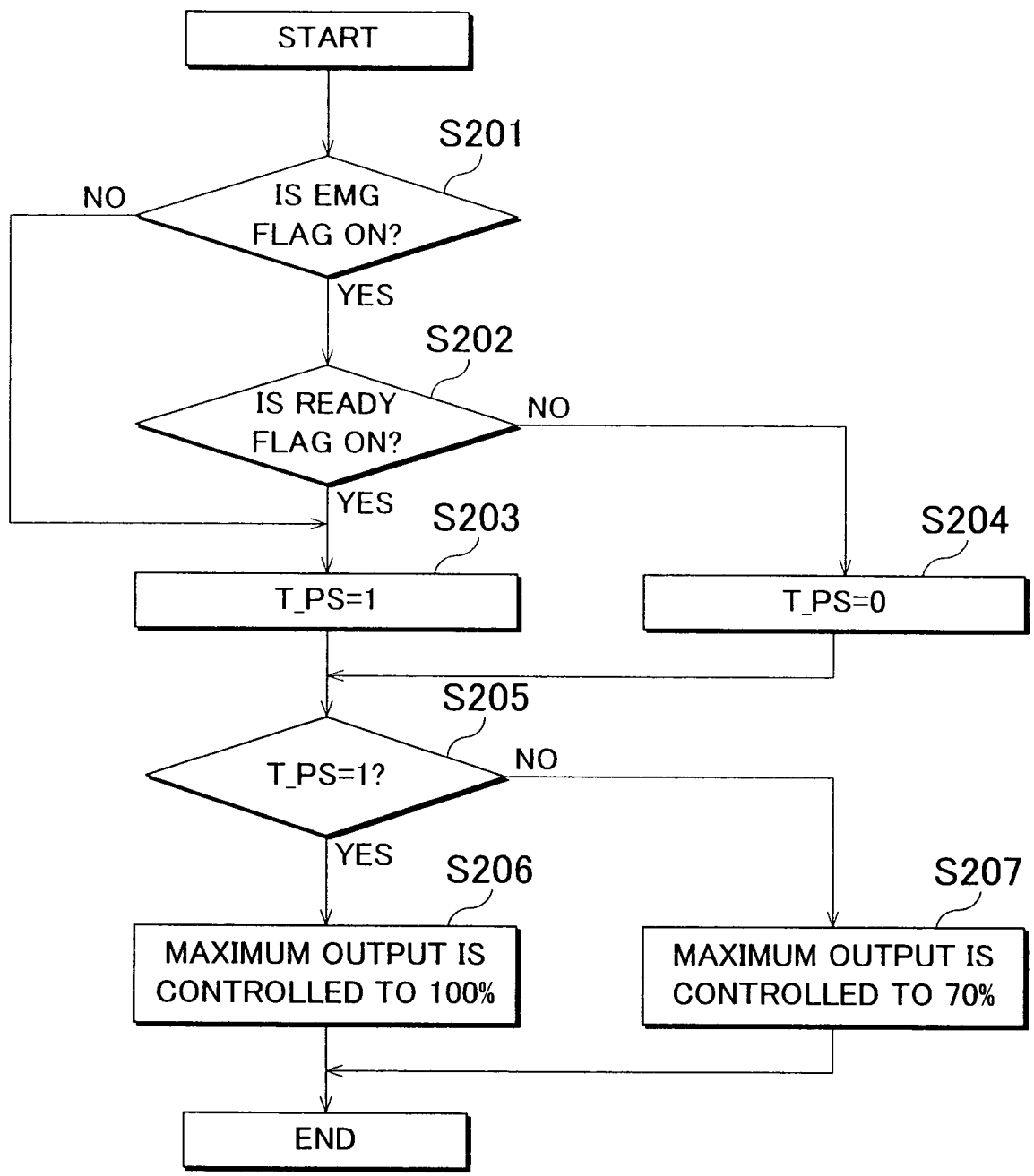
FIG. 6 illustrates the flowchart of the aircraft control routine according to the first embodiment.

More specifically, the aircraft 1 is controlled according to the aircraft control routine shown in the flowchart in FIG. 6. The control routine is performed by the second ECU 41 at predetermined time intervals as an interrupt routine.

First, in step S201, it is determined whether the EMG flag is ON. If an affirmative determination is made, a failure is present in one of the two engines. Accordingly, it is determined in step S202 whether the Ready flag corresponding to the engine operating properly is ON.

When a negative determination is made in step S201 or an affirmative determination is made in step S202, a process for setting T_PS to 1 (T_PS=1) is performed in step S203. On the other hand, if a negative determination is made in step S202, a process for setting T_PS to 0 (T_PS=0) is performed in step S204.

T_PS is used to determine the maximum output that can be used for the aircraft. When both engines operate properly, or when a failure occurs in one of the two engines but the remaining engine can perform the OEI output operation, 100% of the engine output can be used to control thrust and attitude of the aircraft. Therefore, T_PS is set to 1 (T_PS=1). In the other situations, namely, when a failure occurs in one of the two engines and the remaining engine cannot perform the OEI output operation, 100% of the engine output cannot be used for the aircraft. Accordingly, T_PS is set to 0 (TPS=0).

In step S205, it is determined whether T_PS is 1. If an affirmative determination is made, both of the engines operate properly, or even if a failure is present in one of the two engines, the remaining engine can perform the OEI output operation. Accordingly, in the control of thrust and attitude of the aircraft, the control using the engine output of 100% is performed.

On the other hand, if a negative determination is made in step S205, a failure is present in one of the two engines and the remaining engine operating properly cannot perform the OEI output operation yet. Accordingly, the control for limiting the engine output that can be used for the control of thrust and attitude of the aircraft up to approximately 70% is performed. In other words, an amount of increase in the output from the engine operating properly is limited.

Figure 7:
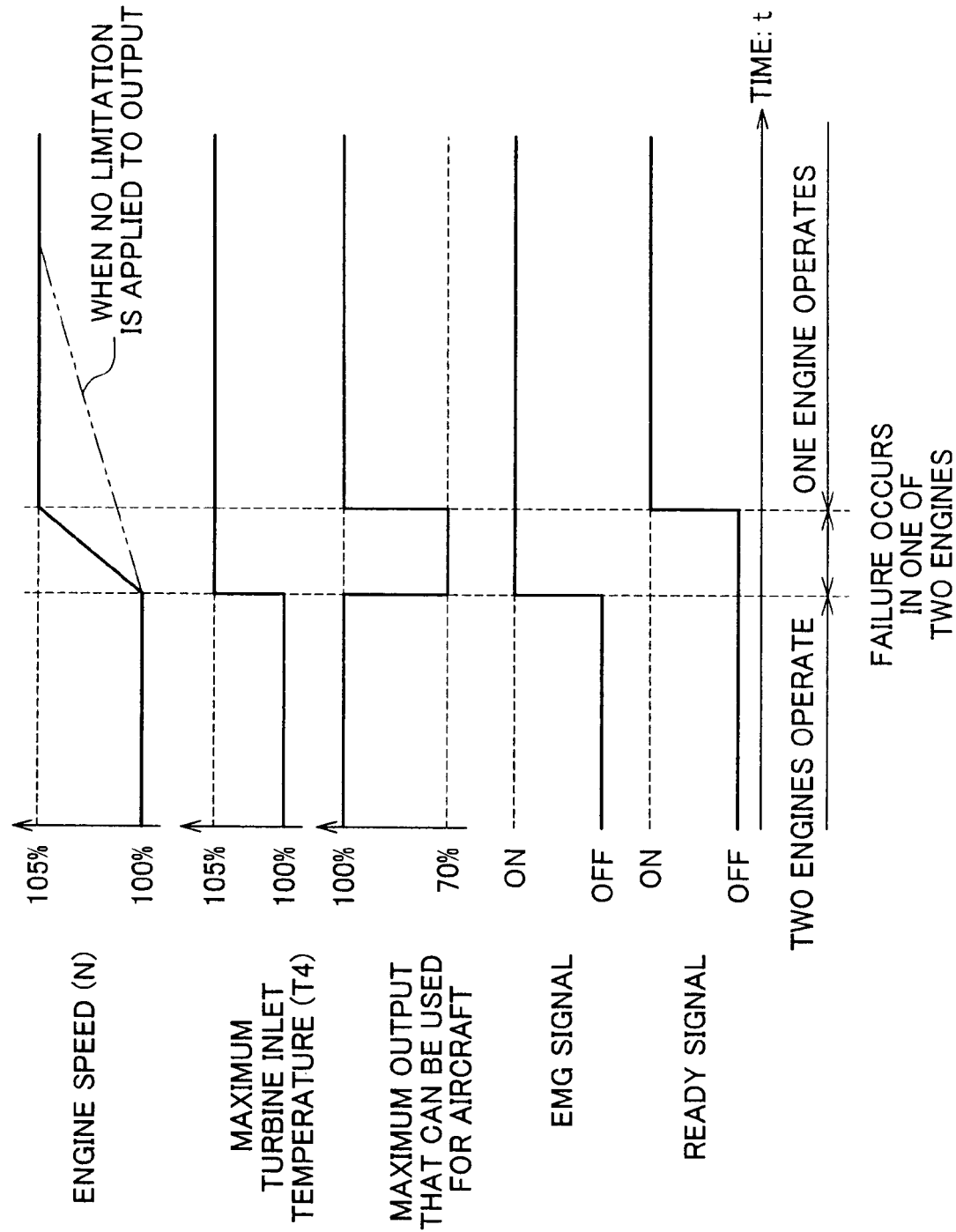
FIG. 7 illustrates the time-sequence chart schematically showing the operation of the aircraft according to the first embodiment.

FIG. 7 schematically illustrates a series of operations during the period from when a failure occurs in one of the two engines and until when the emergency operation is enabled, in the case where the aircraft is controlled according to the control routine.

When a failure occurs in one of the two engines and the remaining engine cannot perform the OEI output operation, the engine output that can be used for the control of thrust and attitude of the aircraft is limited up to approximately 70%. Thus, the engine can be prevented from being overloaded. Thus, shifting to the OEI output operation of the engine can be smoothly performed, and the time required for shifting to the OEI output operation can be reduced.

If the control for limiting the engine output that can be used for the control of thrust and attitude of the aircraft up to approximately 70% is performed, the output that can be used for the aircraft is limited, which affects the control of thrust and attitude. However, the time from when a failure occurs in one of the two engines until the remaining engine is enabled to produce the emergency output is approximately 0.5 seconds, which does not have a considerable influence on the aircraft. Inversely, the advantage of enabling the OEI output operation in a short time is more prominent than such an influence.

Hereafter, a second embodiment will be described. The second embodiment is the same as the first embodiment, except the manner for limiting the engine output that can be used for the aircraft during the period from when a failure occurs in one of the two engines until when the OEI output operation is enabled. Accordingly, the same configuration as those in the first embodiment will not be made below.

Figure 8:
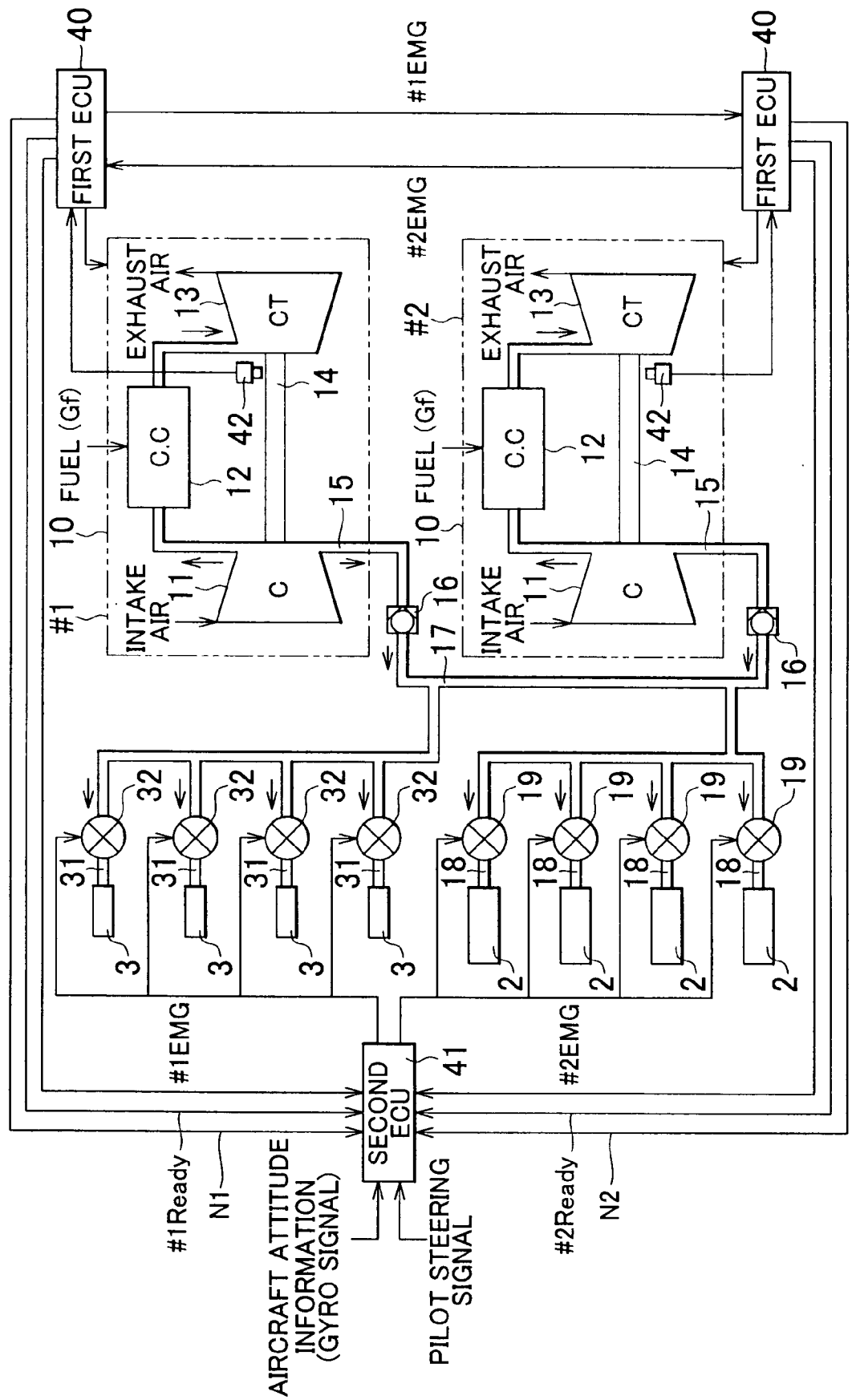
FIG. 8 illustrates the schematic diagram of gas-turbine engines, etc. according to a second embodiment of the invention.

In the embodiment, as shown in FIG. 8, the first ECUs 40 of the two engines transmit the engine speed signals to the second ECU 41 that performs the aircraft control.

During the period from when one of the two engines until fails when the OEI output operation is enabled, the restriction of the amount of the engine output that can be used for the aircraft is controlled minutely based on the engine speed of the remaining engine.

Especially, immediately after a failure occurs in the engine, a problem is likely to occur. If a great amount of output is required by the aircraft immediately after a failure occurs, it is difficult to increase the engine speed to an engine speed at which the emergency output operation can be performed, or there will be a long delay before the engine speed increases to the predetermined engine speed. In order to avoid such a problem, in the first embodiment, the engine output is limited by an approximately predetermined amount, whereby the time required to obtain the sufficient output is reduced.

However, the engine output increases as the engine speed increases. Accordingly, in order to improve the flight performance of the aircraft, the engine output restriction amount may be reduced as the engine speed increases instead of limiting the engine output by the predetermined amount.

Accordingly, in the embodiment, the engine speed signal is input in the second ECU 41. The load limitation amount is reduced with increases in the engine speed (Nm) of the engine that operates properly after a failure occurs in one of the two engines. Accordingly, the output from the engine is increased.

Figure 9:
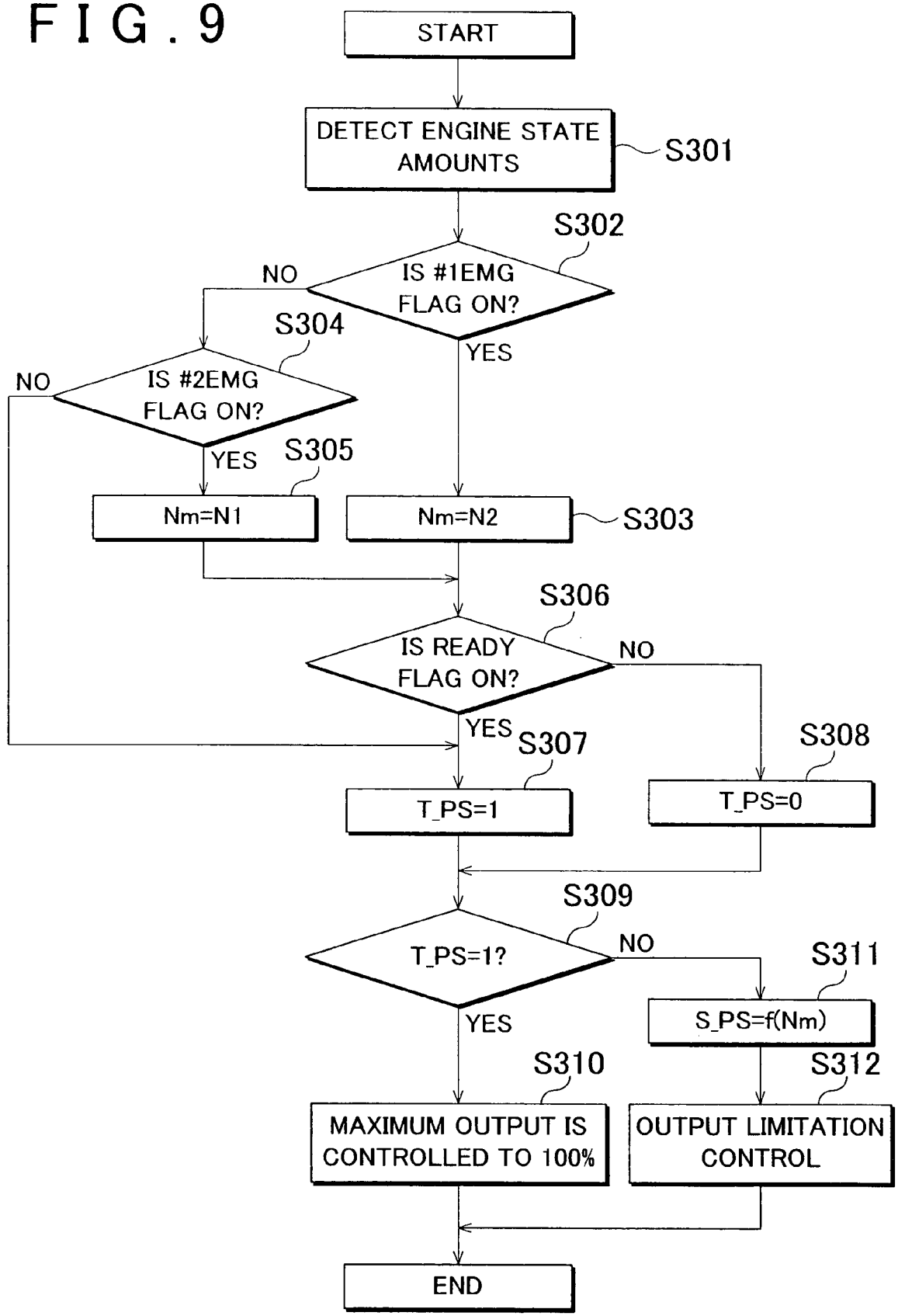
FIG. 9 illustrates the flowchart of the aircraft control routine according to the second embodiment.

More specifically, the aircraft 1 is controlled according to the aircraft control routine shown in the flowchart in FIG. 9. The control routine is performed by the second ECU 41 at predetermined time intervals as an interrupt routine.

First, in step S301, the state amounts of the two engines such as engine speed are detected. Then, it is determined in step S302 whether the #1EMG flag is ON. If an affirmative determination is made, a failure is present in the first engine. Accordingly, the engine speed N2 of the second engine, which is still operational, is assigned to Nm in step S303.

On the other hand, if a negative determination is made in step S304, a failure is not present in the first engine. Accordingly, it is then determined whether a failure is present in the second engine, namely, whether the #2EMG flag is ON. On the other hand, if an affirmative determination is made in step S304, a failure is present in the second engine. Accordingly, the engine speed N1 of the first engine, which still operates properly, is assigned to Nm in step S305.

When a failure is present in the first engine, the engine speed of the second engine needs to be increased. When a failure is present in the second engine, the engine speed of the first engine needs to be increased. Accordingly, in the process described above, the EMG signal is checked, and when the #1EMG signal is ON, the engine speed N2 of the second engine is assigned to Nm. When the #2EMG signal is ON, the engine speed N1 of the first engine is assigned to Nm.

Steps S306 to S310 are the same as steps S202 to S206 described above. Accordingly, steps S306 to S310 will not be described here in detail.

Figure 10:
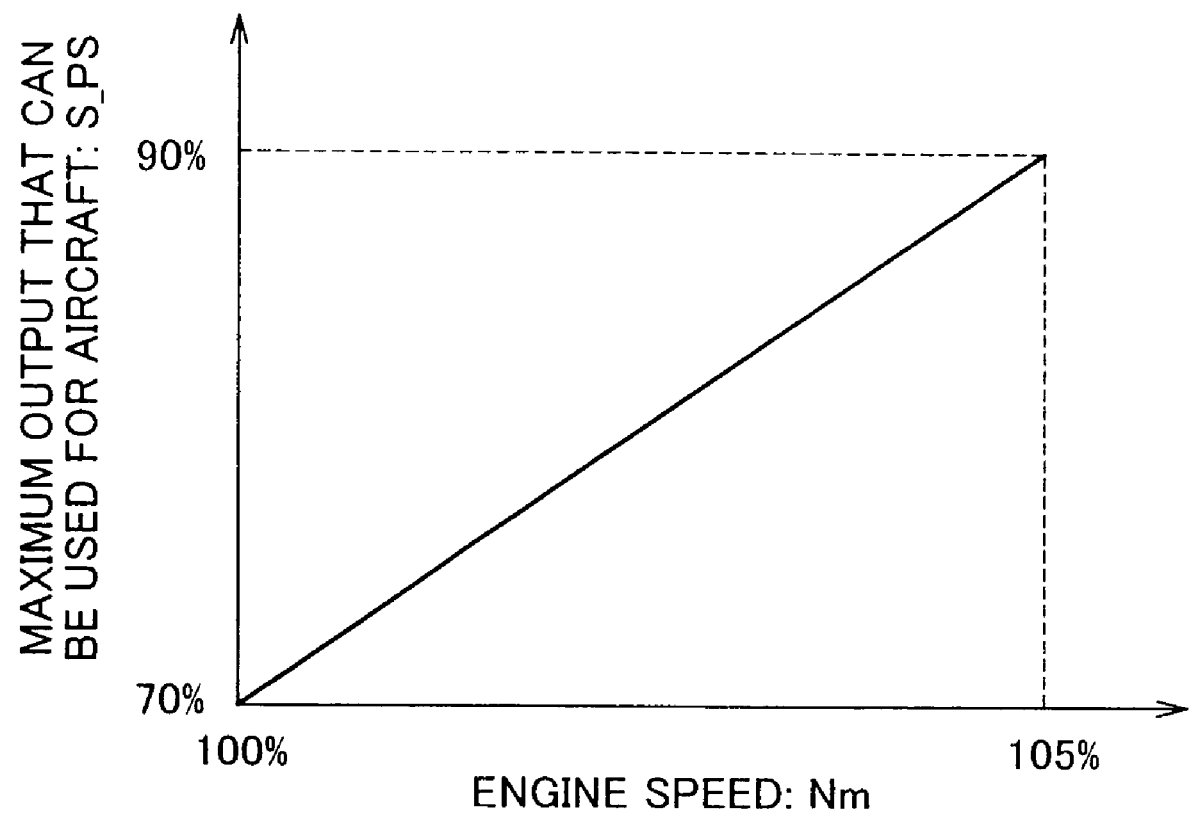
FIG. 10 illustrates the graph showing the relationship between an engine speed Nm and S_PS.

If a negative determination is made in step S309, that is, if it is determined that the engine output of 100% cannot be used for the aircraft, S311 is performed. In step S311, the restriction of the output is set to S_PS, which is determined based on the engine speed Nm as shown in FIG. 10. In step S312, control is performed such that the engine output at S_PS set in step S311 (for example, 70% to 90%) can be used for the aircraft.

By performing the control of thrust and attitude of the aircraft 1 according to the aircraft control routine described above, the horsepower that can be used for controlling the aircraft increases with increases in the engine speed. Accordingly, the engine output that can be used for the control of thrust and attitude increases, and the flight performance improves. The actual engine output also increases with increases in the engine speed.

FIG. 11 schematically illustrates the operation of the aircraft when the aircraft control routine according to the embodiment is used. As a result, part of the engine acceleration energy is used as the engine output used for the aircraft. Accordingly, although the time from when a failure occurs in the engine 1 until when the emergency output operation is started is somewhat longer than that in the first embodiment, the power that can be used for the aircraft actually increases. Therefore, the overall flight performance in the aircraft is improved.

What is claimed is:

1. A control apparatus for an aircraft, comprising:
two gas-turbine engines;
two extraction passages through which compressed air discharged from the respective engines flows;
an air collecting passage in which the compressed air flowing from one of the two extraction passages and the compressed air flowing from the other extraction passage are gathered, and through which the compressed air flows;
a thrust generator that generates thrust using the compressed air flowing from the air collecting passage; and
an attitude control portion that performs a control of at least one of thrust and attitude of an aircraft using the compressed air flowing from the air collecting passage, wherein,
when both of the two engines operate properly, the attitude control portion performs the control of at least one of thrust and attitude of the aircraft using a two-engine-output that is produced evenly by the two engines,
when a failure occurs in one of the two engines, the attitude control portion increases a one-engine-output that is produced by the remaining engine operating properly, and limits an amount of increase in the one-engine-output such that the one-engine-output that is produced by the remaining engine operating properly is less than the two-engine-output that is produced when both of the two engines operate properly, until the remaining engine is enabled to produce an emergency output; and
wherein, when the emergency output is produced, the attitude control portion makes an engine speed and a turbine inlet temperature higher than those when both of the two engines operate properly and the two-engine-output is produced evenly by the two engines.

2. A control apparatus for an aircraft, comprising:
two gas-turbine engines;
two extraction passages through which compressed air discharged from the respective engines flows;
an air collecting passage in which the compressed air flowing from one of the two extraction passages and the compressed air flowing from the other extraction passage are gathered, and through which the compressed air flows;
a thrust generator that generates thrust using the compressed air flowing from the air collecting passage; and
an attitude control portion that performs a control of at least one of thrust and attitude of an aircraft using the compressed air flowing from the air collecting passage, wherein,
when both of the two engines operate properly, the attitude control portion performs the control of at least one of thrust and attitude of the aircraft using a two-engine-output that is produced evenly by the two engines,
when a failure occurs in one of the two engines, the attitude control portion increases a one-engine-output that is produced by the remaining engine operating properly, and limits an amount of increase in the one-engine-output such that the one-engine-output that is produced by the remaining engine operating properly is less than the two-engine-output that is produced when both of the two engines operate properly, until the remaining engine is enabled to produce an emergency output; and
wherein, when the failure occurs in one of the two engines, the attitude control portion makes the one-engine-output less than the two-engine-output by a predetermined amount, until the remaining engine that operates properly is enabled to produce the emergency output.

3. A control apparatus for an aircraft, comprising:
two gas-turbine engines;
two extraction passages through which compressed air discharged from the respective engines flows;
an air collecting passage in which the compressed air flowing from one of the two extraction passages and the compressed air flowing from the other extraction passage are gathered, and through which the compressed air flows;
a thrust generator that generates thrust using the compressed air flowing from the air collecting passage; and
an attitude control portion that performs a control of at least one of thrust and attitude of an aircraft using the compressed air flowing from the air collecting passage, wherein,
when both of the two engines operate properly, the attitude control portion performs the control of at least one of thrust and attitude of the aircraft using a two-engine-output that is produced evenly by the two engines,
when a failure occurs in one of the two engines, the attitude control portion increases a one-engine-output that is produced by the remaining engine operating properly, and limits an amount of increase in the one-engine-output such that the one-engine-output that is produced by the remaining engine operating properly is less than the two-engine-output that is produced when both of the two engines operate properly, until the remaining engine is enabled to produce an emergency output; and
wherein, when the failure occurs in one of the two engines, the attitude control portion makes the one-engine-output less than the two-engine-output based on an engine speed of the remaining engine that operates properly, until the remaining engine that operates properly is enabled to produce the emergency output.

4. The control apparatus according to claim 3, wherein the attitude control portion reduces an amount of limitation applied on the one-engine-output as the engine speed increases.

5. A control apparatus for an aircraft, comprising:
two gas-turbine engines;
two extraction passages through which compressed air discharged from the respective engines flows;
an air collecting passage in which the compressed air flowing from one of the two extraction passages and the compressed air flowing from the other extraction passage are gathered, and through which the compressed air flows;
a thrust generator that generates thrust using the compressed air flowing from the air collecting passage; and
an attitude control portion that performs a control of at least one of thrust and attitude of an aircraft using the compressed air flowing from the air collecting passage, wherein,
when both of the two engines operate properly, the attitude control portion performs the control of at least one of thrust and attitude of the aircraft using a two-engine-output that is produced evenly by the two engines,
when a failure occurs in one of the two engines, the attitude control portion increases a one-engine-output that is produced by the remaining engine operating properly, and limits an amount of increase in the one-engine-output such that the one-engine-output that is produced by the remaining engine operating properly is less than the two-engine-output that is produced when both of the two engines operate properly, until the remaining engine is enabled to produce an emergency output; and
wherein, when the failure occurs in one of the two engines, the attitude control portion makes the one-engine-output less than a maximum allowable engine output that can be produced by each of the two engines operating properly, until the remaining engine that operates properly is enabled to produce the emergency output.

6. A control apparatus for an aircraft, comprising:
two gas-turbine engines;
two extraction passages through which compressed air discharged from the respective engines flows;
an air collecting passage in which the compressed air flowing from one of the two extraction passages and the compressed air flowing from the other extraction passage are gathered, and through which the compressed air flows;
a thrust generator that generates thrust using the compressed air flowing from the air collecting passage; and
an attitude control portion that performs a control of at least one of thrust and attitude of an aircraft using the compressed air flowing from the air collecting passage, wherein,
when both of the two engines operate properly, the attitude control portion performs the control of at least one of thrust and attitude of the aircraft using a two-engine-output that is produced evenly by the two engines,
when a failure occurs in one of the two engines, the attitude control portion increases a one-engine-output that is produced by the remaining engine operating properly, and limits an amount of increase in the one-engine-output such that the one-engine-output that is produced by the remaining engine operating properly is less than the two-engine-output that is produced when both of the two engines operate properly, until the remaining engine is enabled to produce an emergency output; and
wherein, when the failure occurs in one of the two engines, if the remaining engine that operates properly can produce the emergency output, the attitude control portion permits the remaining engine that operates properly to produce the one-engine-output up to a maximum output.

* * * * *